March 23, 1965  R. R. YOUNG  3,174,680
SHAFTING FOR GAS COMPRESSORS
Filed June 27, 1963
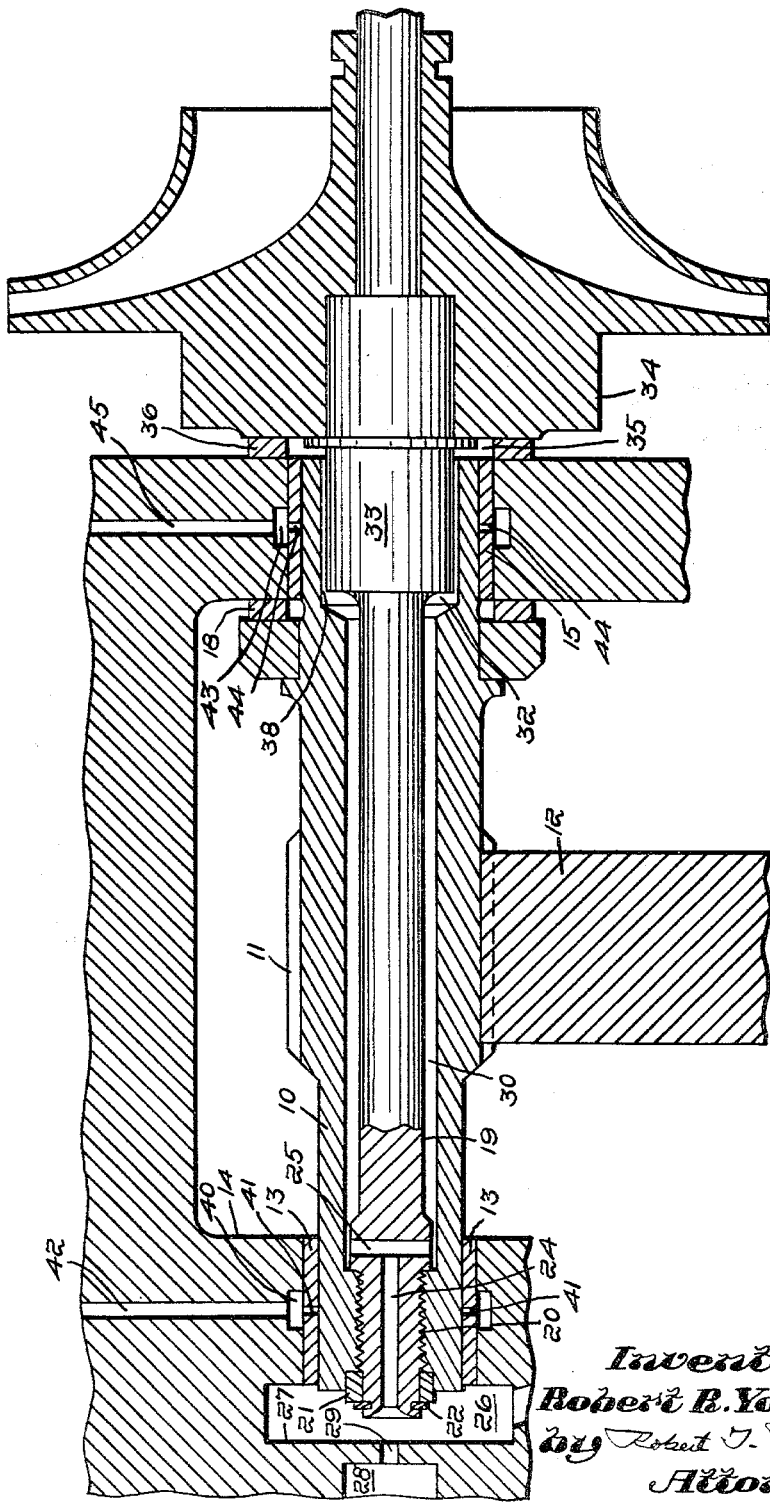
Inventor:
Robert R. Young,
by Robert T. Palmer
Attorney United States Patent Office 3,174,680
Patented Mar. 23, 1965

3,174,680
SHAFTING FOR GAS COMPRESSORS
Robert R. Young, Staunton, Va., assignor to Westinghouse Electric Corporation, Pittsburgh, Pa., a corporation of Pennsylvania
Filed June 27, 1963, Ser. No. 290,987
6 Claims. (Cl. 230—127)

This invention relates to the shafting of high speed machines, and relates more particularly to the shafting between a step-up gear train and a rotor of a centrifugal refrigerant compressor.

With a high speed rotating shaft between a gear train and a compressor rotor, it is desirable to operate the shaft at a speed below its first lateral critical speed so that it is not necessary to pass through the critical point and risk "rubs" during start-up. It is also desirable to keep the resonant vibration of each component from being transmitted to the other components with resulting large vibration amplitudes, by connecting the components with shafting having torsional flexibility. This means that the design of the arrangement should be laterally stiff for high lateral critical speed, and torsionally flexible for low torsional critical speed. Usually, this is accomplished by mounting the gear train shaft and the rotor shaft, each on its own bearings, and connecting the shafts with a long, small diameter, quill shaft, the two sets of bearings providing the desired lateral stiffness, and the quill shaft providing the desired torsional flexibility. This, however, requires two complete sets of bearings with the associated complexity and power loss.

This invention provides the desired lateral stiffness and torsional looseness using but one set of bearings. This is accomplished by mounting a hollow pinion gear shaft on a set of bearings, and solidly attaching a long, torsionally flexible shaft to the aft side of the gear shaft through the hollow center of the latter. The inner surface of the gear shaft at the forward bearing serves as a forward support for the flexible shaft, allowing the latter to twist with torsional freedom. The diameter of the torsional shaft is increased at its forward end for receiving the rotor of a centrifugal compressor. The fretting wear between the inner surface of the pinion gear shaft and the adjacent outer surface of the torsional shaft is reduced to a negligible amount by circulating therebetween a large quantity of lubricant.

An object of this invention is to improve the shafting connecting high speed driving and driven components.

Another and more definite object of this invention is to provide improved shafting for connecting a gear train to a rotor of a centrifugal compressor.

This invention will now be described with reference to the annexed drawing which is a longitudinal section of driving and driven shafts embodying this invention.

An outer, hollow shaft 10 has a pinion gear 11 formed thereon between its ends, and the teeth of which mesh with the teeth of a bull gear 12, the upper portion only of which is shown, and which is driven by an electric motor which is not shown. The aft or inner end of the shaft 10 is supported by a bearing 13 from a casing wall 14. The outer or forward end of the shaft 10 is supported by a bearing 15 from the wall 14. There is a shoulder 16 on the shaft 10 adjacent to the bearing 15, with a thrust washer 17 between the shoulder 16 and a thrust bearing 18, the inner side of the latter contacting the wall 14 where it extends around the bearing 15.

The inner end of an inner shaft 19 is threaded at 20 into the inner end of the shaft 10. A washer 21 around the inner end of the shaft 19 extends partially into a recess in the inner end of the shaft 10, and is held in position by a snap-ring 22 which is recessed in the shaft 19 inwardly of the washer 21.

The inner end portion of the shaft 19 has an internal circular bore 24, the inner end of which is open at the inner end of the shaft 19, and the outer end of which is connected to a radial bore 25 in the shaft 19. The wall 14 has an opening 26 extending around the inner end of the bearing 13 and between the inner ends of the shafts 10 and 19 and the bearing 13, and vertical surface 27 of the wall 14. The wall 14 has a large circular opening 28 and a small circular opening 29 concentric with the opening 28 and the bore 24. Lubricant supplied under pressure from a source which is not shown, is forced through openings 28, 29 and 26 into the bores 24 and 25. The bearing 13 receives lubricant supplied through a passage 42 in the wall 14 into an annulus 40 and radial bores 41.

The shaft 10 has a central, circular opening 30 around and spaced from the inner shaft 19 between the bearings 13 and 15, and into which the radial bore 25 discharges. The opening 30 connects as its outer end with a larger, circular opening 32 in the shaft 10, which extends around the inner portion of a circular enlargement 33 of the shaft 19, and through that portion of the wall 14 which extends around the bearing 15. Rotor 34 of a centrifugal refrigerant compressor is attached to the outer portion of the shaft enlargement 33. There is an annular clearance space between the outer surface of the inner portion of the shaft enlargement 33 and the inner surface of the shaft 10 where it extends around the latter.

Lubricant forced out the radial bore 25 passes into the opening 30 and from the latter into the opening 32 and through the clearance space 38 into a circular passage 35 around which extends a thrust bearing 36 which extends between the inner end of the rotor 34 and the adjacent surface of the wall 14. Lubricant supplied through a passage 45 in the wall 14 into an annulus 43 and radial bores 44 lubricates the bearing 15. Lubricant from the passage 35 and the bearing 15 lubricates the bearing 36. Lubricant from the bearing 15 lubricates the bearing 18.

The layer of lubricant within the clearance space 38 lubricates the enlargement 33 of the inner shaft 19 and the surrounding inner surface of the shaft 10, while permitting the shaft 19 to twist with torsional freedom. The layer of lubricant within the clearance space 38 also prevents any significant fretting between the outer surface of the shaft enlargement 33 and the inner surface of the shaft 10 where it extends around the enlargement 33.

Thus, it is seen that the inner shaft 19 is rigidly attached at its inner end to the inner end of the outer shaft 10, and that the enlargement 33 of the shaft 19 is so supported that the shaft 19 can twist with torsional freedom. The desired lateral stiffness is provided by the large shaft 10, its one set of bearings 13 and 15, and the rigid attachment of one end of the smaller shaft 19 to the corresponding end of the shaft 10, and the desired torsional looseness is provided by the shaft 19 having a relatively small diameter between its ends, and by the shaft 19 being supported near its other end through a joint which is torsionally flexible.

There are fewer bearings than in prior designs having the same purpose, and space is saved through extending the larger length of the torsional shaft 19 within the interior of the outer shaft 10.

What is claimed is:

1. A gas compressor comprising a hollow driving shaft, bearings around the ends of said shaft, a driven shaft within said driving shaft and having its inner end rigidly attached to the inner end of said driving shaft, the remainder of said driven shaft being spaced from said driving shaft, said driven shaft having a cylindrical enlargement with an inner portion within the outer end of said driving shaft and with an outer portion extending through said outer end, a compressor rotor on said outer portion, there being an annular clearance space between the outer surface of said inner portion and the inner surface of said driving shaft where it extends around said inner portion, and means for supplying lubricant into said clearance space.

2. A gas compressor as claimed in claim 1 in which the means for supplying lubricant includes an axial bore in said inner end of said driven shaft, a radial bore in said driven shaft connecting with said axial bore, and a passage around said driven shaft and connecting with said radial bore and said clearance space.

3. A gas compressor comprising a hollow driving shaft, a driven shaft within said driving shaft, bearings around the ends of said driving shaft, means rigidly attaching the inner end of said driven shaft to the inner end of said driving shaft, said driven shaft having a cylindrical enlargement with an inner portion within the outer end of said driving shaft and having an outer portion extending through said outer end, a compressor rotor on said outer portion, there being an annular passage around said driven shaft between its said inner end and said enlargement, there being an annular clearance space smaller than said passage between the outer surface of said inner portion and the inner surface of said driving shaft where it extends around said inner portion, and means for supplying lubricant through said annular passage into said clearance space.

4. A gas compressor as claimed in claim 3 in which said means for supplying lubricant includes an axial bore in said inner end of said driven shaft, and a radial bore in said driven shaft connecting with said axial bore and said passage.

5. A gas compressor comprising a casing wall having spaced-apart, vertically extending inner and outer portions, bearings within said portions, a hollow driving shaft having its ends in said bearings, a driven shaft within said driving shaft and having its inner end rigidly attached to the inner end of said driving shaft, said inner wall portion having an oil supply opening connecting with said inner ends of said shafts and with the inner end of said bearing within said inner wall portion, said driven shaft having an axial bore connecting with said opening and having a radial bore connecting with said axial bore, said driven shaft having a cylindrical enlargement on its outer end which extends through the outer end of said driving shaft with an outer portion extending outwardly beyond the said outer end of said driving shaft, a compressor rotor on said last mentioned portion, there being an annular passage within said driving shaft around said driven shaft between said radial bore and said enlargement and connecting with said radial bore, there being an annular clearance space between the outer surface of said enlargement and the inner surface of said outer end of said driving shaft where it extends around said enlargement, said clearance space connecting with said passage and having a smaller axial dimension than said passage.

6. A gas compressor as claimed in claim 5 in which there is a first bearing around said driving shaft with its outer side in contact with the inner side of said outer wall portion, in which there is a thrust washer on said driving shaft with its outer side in contact with the inner side of said thrust bearing, in which there is a second thrust bearing around said outer portion of said enlargement with its inner side in contact with the outer side of said outer wall portion and with its outer side in contact with the inner side of said rotor.

References Cited by the Examiner

UNITED STATES PATENTS

| 2,324,484 | 7/43 | Shore | 230—138 |
| 2,378,452 | 6/45 | Vincent | 230—132 |
| 2,480,095 | 8/49 | Buchi | 230—207 |
| 2,695,131 | 11/54 | Price | 103—111 |

FOREIGN PATENTS

| 740,905 | 11/55 | Great Britain. |
| 274,964 | 7/51 | Switzerland. |

JOSEPH H. BRANSON, JR., *Primary Examiner.*